Oct. 2, 1956 W. J. DORNHOEFER 2,765,436
POWER TRANSMISSION
Filed July 28, 1950 2 Sheets-Sheet 1

INVENTOR.
WARREN J. DORNHOEFER
BY
ATTORNEY

United States Patent Office 2,765,436
Patented Oct. 2, 1956

2,765,436

POWER TRANSMISSION

Warren J. Dornhoefer, Kirkwood, Mo., assignor to Vickers Incorporated, Detroit, Mich., a corporation of Michigan Application July 28, 1950, Serial No. 176,305

13 Claims. (Cl. 321—18)

This invention relates to power transmission apparatus, and more particularly to apparatus for operating variable resistance load devices.

In general, direct current generators have been the major source of power for direct current arc welding. A direct current generator inherently has all the common disadvantages of rotating electric machinery, expensive maintenance being one of the major disadvantages. Obviously a static apparatus would be most desirable for this purpose.

Apparatus for supplying current for arc welding must be able to operate intermittently from open circuit before the arc is struck to short circuit which occurs when the arc is struck or when globules of molten metal short circuit the arc. The volt-ampere characteristics of the supply source must be such that the arc is stable. The length and volume of the arc, and hence the voltage and the current, very rapidly with time so that the supply source operates continuously under transient conditions, changes taking place with considerable rapidity. Thus current supply and control to a variable resistance load, such as an electric arc, presents several problems, the most important perhaps being the heavy current rush when a short or near short circuit condition occurs. This is especially so in direct current arc welding, and if allowed to occur the heavy current will cause damage and inefficient welding such as excessive spattering and sticking of the welding rod to the work. This demands that the regulatory portion of the supply apparatus immediately respond to transients so as to hold the supply current within desirable limits under conditions approaching short circuits. Other desirable features in such an apparatus are the adjustability of the effective internal impedance of the supply circuit and of the open circuit voltage of the supply.

Various approaches have been made to solve these problems with rectifier supply circuits using ballast resistors or reactors on the rectifier side of the supply, and/or inductive reactors in the alternating current circuit supplying the rectifier. However, most of such attempts have been impractical and inefficient for various reasons such as cumbersome apparatus, economic considerations, etc.

The present invention contemplates a new and useful apparatus for energizing a variable resistance load using therefor a saturable reactor for controlling a rectifier supplying current to the load.

In accordance with one embodiment of the invention a current forcing circuit operable in response to an increase in load current, especially due to transients, acts to increase the impedance of the saturable reactor. Other aspects of the invention are adjustability of the open circuit voltage and of the control of the slope of the volt-ampere characteristic of the supply circuit.

It is therefore an object of this invention to provide a new and useful apparatus for operating variable resistance load devices.

It is a further object of this invention to provide a new and useful apparatus for operating negative resistance load devices, such as electric arcs, etc.

Further objects and advantages of the present invention will be apparent from the following description, reference being had to the accompanying drawings wherein a preferred form of the present invention is clearly shown.

Figure 1:
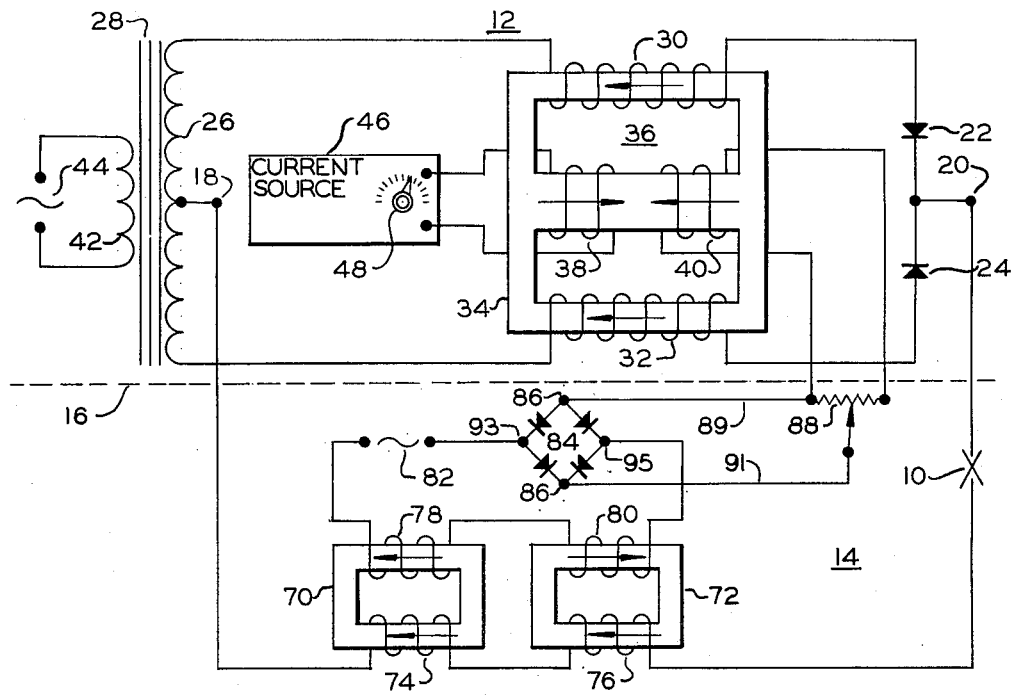
Figure 1 is a diagram illustrating a single phase embodiment of the invention.

Referring now to Figure 1, the illustrated apparatus diagram may be divided into three parts—a variable resistance load 10, for example an arc welding load; a power supply unit 12 for supplying unidirectional current to the load 10; and a current forcing feedback circuit 14 for controlling the effective impedance of the unit 12 so as to substantially maintain desirable voltage-current output characteristics of the unit regardless of sudden and repeated transients, such as short circuits and other variations in the load resistance.

The power supply unit 12 is located above the dotted line 16, and is a saturable reactor controlled rectifier, and will be recognized as a bi-phase self-saturating magnetic amplifier with a full wave direct current output furnished to its output terminals 18 and 20. Included in the unit 12 are a pair of rectifying devices 22 and 24 which are preferably of the dry plate type with one set of like electrodes connected together and to the output terminal 20. The rectifying devices 22 and 24 receive energy from the secondary 26 of a transformer 28 through a pair of separate main windings 30 and 32 carried by the core 34 of a saturable reactor device 36, which is also provided with a pair of control windings 38 and 40. The primary 42 of the transformer 28 is connected across a source of alternating current 44, and the center tap of the transformer secondary is connected to the output terminal 18.

The winding 38 is energized by a source of current 46 provided with a current control 48 which, when operated is effective to change the impedance of the reactor 36, and thereby adjust the open circuit voltage at the output terminals 18 and 20 to any desired level.

Figure 2:
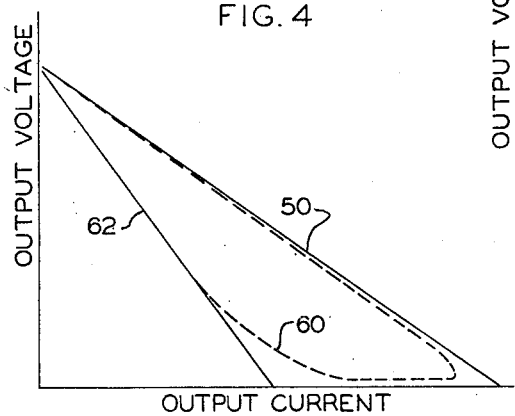
Figure 2 is a chart illustrating the relation between the volt-ampere output curves of the apparatus herein, with and without feedback.
Figure 3:
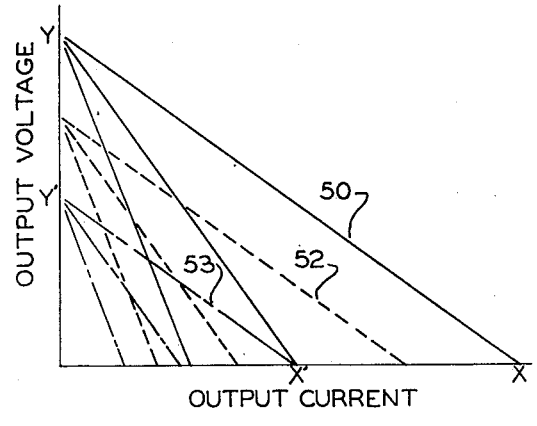
Figure 3 is another chart showing curves illustrating the adjustability of the open circuit voltage and of the slope of the volt-ampere characteristics.

With the power supply unit thus far described, the output volt-ampere curve may be such, for example, as curve 50 in Figures 2 and 3. The current volt-ampere curve is obtained by plotting the voltage and current for load resistances ranging from open circuit to short circuit. Curves 52 and 53 are examples of such curves taken with a different open circuit voltage obtained by adjusting control current in winding 38. Assuming that the short circuit current X of curve 50 is too high for the work and apparatus, the only way that it can be reduced with the apparatus thus far described is by reducing the open circuit output voltage from Y to some lower point Y' so that the short circuit current will be at a safe value X'. However, this may result in output voltage values too low to strike and maintain the arc with a suitable degree of stability.

Figure 4:
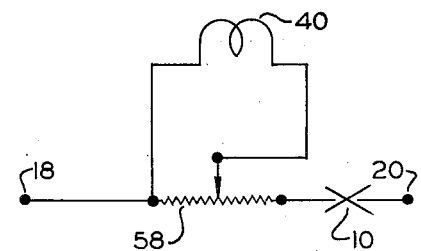
Figure 4 is a diagram of a simple feedback circuit.

A more desirable way to obtain a characteristic which will result in an output curve having a reduced short circuit current value is to regulate the power supply unit in such a manner as to change the slope of the volt-ampere characteristic while retaining a desired open circuit output voltage. This may be done by negative feedback, that is, by utilizing a current which is a function of the load current (or a current proportional to the load current) to energize the control winding 40, thereby to increase the impedance of the reactor and therefore the effective internal impedance of the apparatus which is reflected in the slope of the output volt-ampere characteristic. The feedback current may be a portion of the load current or it may be current from an independent source which will increase when the load current increases, and vice versa. One way of doing this is by diverting a selected portion of the load current, as shown in Figure 4. The circuit in this figure would be connected between the output terminals 18 and 20 instead of the circuit 14. As shown, the control coil 40 is connected across a resistor 58 which is in series with the load 10. The relative M. M. F.'s of the main and control windings are shown throughout the drawings by the arrows adjacent each winding. Although the circuit of Figure 4 will permit some adjustment of the slope of the volt-ampere output curve, the apparatus will not respond fast enough to the ever present transients in arc welding loads so as to limit resulting current surges. During transients, such as short circuits, the current surges will go beyond safe and desirable operating limits to cause damage and poor welding conditions such as excessive spattering and sticking of the welding rod to the work.

The action of the apparatus with the feedback circuit of Figure 4, can be visualized in the dotted curve 60 shown in Figure 2. In this figure, curve 50 is the output volt-ampere characteristic without feedback. In order to bring the steady state short circuit current within safe limits the control is adjusted to change the slope of the volt-ampere curve so that it will correspond to the curve 62 in Figure 2. This curve represents steady state conditions. During low resistance transients, because of slow response, a volt-ampere characteristic similar to curve 60 will be assumed resulting in excess short circuit current before the apparatus can settle (between transients) to a place on the curve 62.

Perhaps the main reason for the sluggish response to transients is the opposition to the control current due to voltages induced in the coil 40 by self induction and mutual induction with the main windings 30 and 32 as a result of changes in control current and load current. These induced voltages are large, and may predominate at the start of a transient. They are not present when equilibrium conditions are reached. A time lag therefore occurs before the negative feedback effect of the coil 40 is realized and equilibrium is reached. The operating ideal is to avoid any variation from the selected steady state volt-ampere characteristic, even during violent and repeated transients. In order to speed up the response it is necessary to force the flow of feedback current into the coil 40 against the high E. M. F. induced by transients. This may be accomplished in a measure by amplifying the diverted feedback current before it reaches the coil 40. However, a preferred current forcing circuit is shown at 14 in Figure 1.

The current forcing circuit 14 is a direct current detector with a current output proportioned to the detected current and its changes. It includes a pair of saturable reactors 70 and 72 carrying direct current windings 74 and 76 and alternating current windings 78 and 80. The direct current windings 74 and 76 are connected in series with each other and the load 10 between the output terminals 18 and 20 of the power supply unit 12. The alternating current windings 78 and 80 are connected in series with each other, with a source of alternating current 82, and a rectifier 84 whose output 86—86 is connected to the control winding 40 through a control resistance 88. The relation of the alternating current windings to the direct current windings is such that during one half cycle of the alternating current from the source 82 the M. M. F.'s of the two windings of one reactor are additive, while those of the other reactor are subtractive, the reverse being true during the other half cycle. A substantially mirror image of the load current appears at the output terminals 86—86 of the forcing circuit 14, and a constancy of the current proportionality is maintained over the useful operating range of the welding circuit regardless of voltage variations. Thus during transients, feedback current is forced to flow without appreciable lag in the control winding 40 with an amplitude at least as great as normally required to substantially maintain desirable steady state conditions, for example, such as reflected in the curve 62. Actually with properly designed components the apparatus can be made to operate so that even under short circuit transients the current surge may be substantially confined to a locus along the selected steady state volt-ampere curve. In other words the dynamic volt-ampere output characteristic can be made to approximate a desired steady state volt-ampere characteristic. The open circuit output voltage may be adjusted by adjusting the control 48.

Since there are well known methods of controlling a self saturable reactor with alternating current as well as direct current, the reactor, by proper sensing and placement of control windings, can be arranged to respond properly with alternating current for the open circuit voltage control winding 38, and with alternating current in the negative feedback slope control winding 40 by eliminating the rectifier 84 and connecting the negative feedback leads 89 and 91 to points 93 and 95 which would then be the new output of the current forcing circuit 14. However, with alternating current each of the control coils 38 and 40 would have to be divided, and their separate series connected halves would be placed on the opposite legs of the core shown or on separate cores, each with one of the main windings 30 and 32. For alternating current control the current source 46 would be changed to alternating current.

Figure 5:
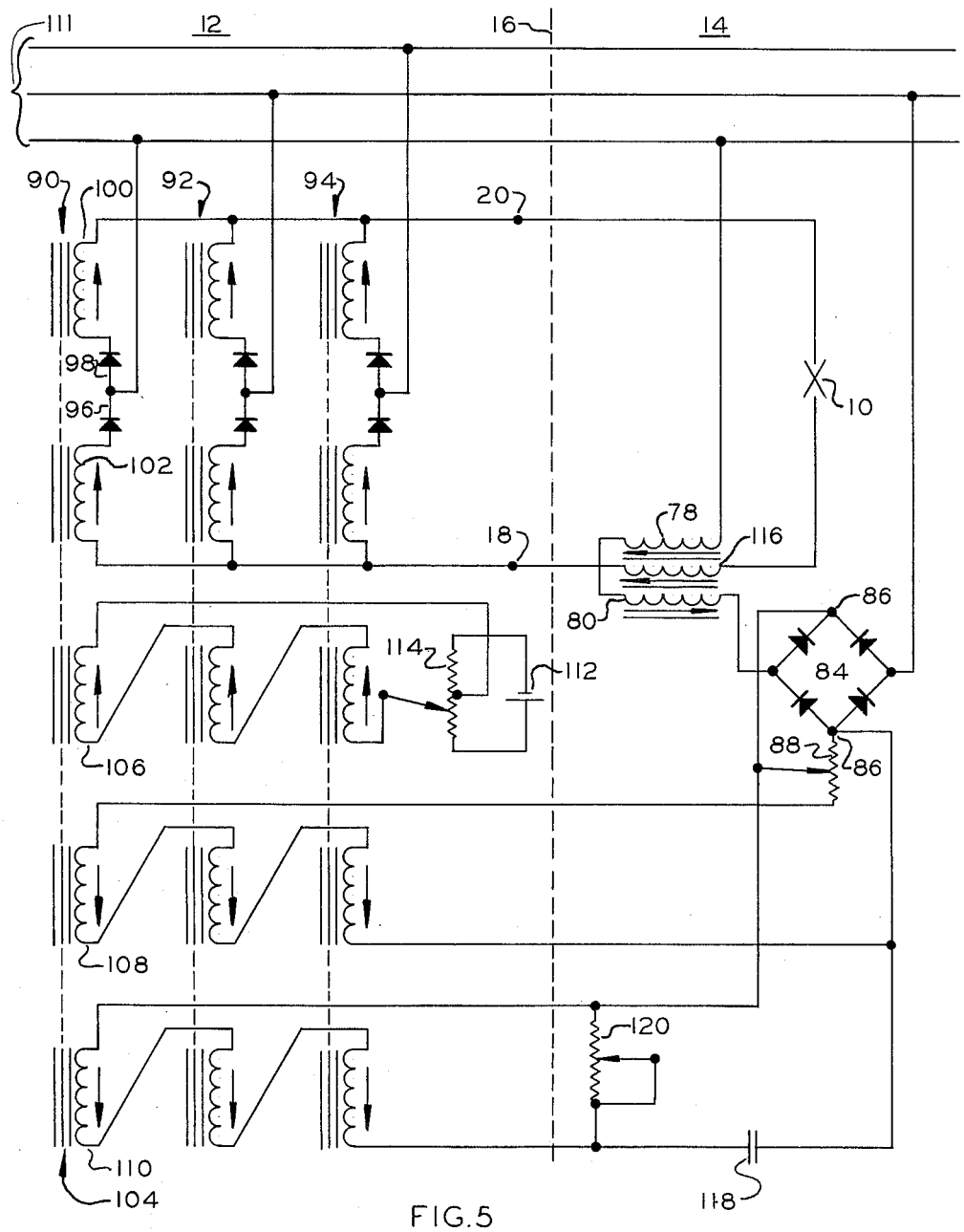
Figure 5 is a diagram illustrating a three-phase embodiment of the invention.

A circuit embodying the invention and designed for operation from a three-phase source of supply is shown in Figure 5 wherein the three major portions of the circuit, the load 10, the power supply unit 12, and the current feedback forcing circuit 14, bear the same reference numerals as in Figure 1, and as in that figure the unit 12 is on one side of a dotted line 16 while the forcing circuit 14 is on the other side. Unit 12 in Figure 5 is a direct current output magnetic amplifier having the specific form of a saturable reactor controlled three-phase full wave rectifier bridge with the reactors connected in self-saturating arrangement. The output terminals 18 and 20 of the power supply unit 12 are connected to three parallel bridge branches 90, 92, and 94, each of which includes a pair of rectifying devices 96 and 98 connected together and in series with a pair of main windings 100 and 102 of a reactor 104 which is also provided with a plurality of control windings 106, 108, and 110 for controlling the impedance of the reactor by controlling the amount of control ampere-turns supplied thereto. A three-phase alternating current source 111 is connected to the junctions between the rectifying devices in each branch.

Current for energizing the control windings 106 is provided by a source 112, for example a battery, through an adjustable impedance 114, which may be used to adjust the amplitude of the open circuit voltage at the output terminals 18 and 20.

Windings 108 are so related to the main windings 100 and 102 that, when energized, they cause the impedance of the main windings to be increased. Feedback current may be supplied to the windings 108 in the same manner as heretofore described for winding 40 of Figure 1, i. e., by diverting a portion of the load current thereto or by supplying them with independent current proportional to the load current. The feedback circuit 14 of Figure 5 is similar to that of Figure 1. Its output is substantially proportional to the load current and its changes, and because of its ability to maintain a substantial constancy in the proportionality of its output current relative to the load current, it acts as a current forcing circuit against the opposing E. M. F.'s induced in the control winding 108 as a result of self inductance and of current changes in the reactor main windings due to load transients.

As in Figure 1 the feedback circuit 14 of Figure 5 includes a rectifier 84 in series with an alternating current source and a pair of alternating current windings 78 and 80 which are shown, by way of variation, to be mounted on one saturable core with one direct current winding 116 taking the place of the two windings 74 and 76 shown in Figure 1. Of course the same M. M. F. relations between the respective alternating current windings and the direct current windings must be preserved as called for in Figure 1, i. e., for one-half cycle the M. M. F., due to winding 116, aids the M. M. F. of winding 78 while opposing the M. M. F. of winding 80, the entire action reversing for the next half cycle.

Arrows adjacent the windings indicate instantaneous M. M. F. relations. The direct current output 86—86 of the feedback circuit is fed to the control coils 108 through an adjustable control 88 as in Figure 1, the control serving the same purpose, adjustment of the slope of the output volt-ampere characteristic to a selected steady state pattern.

Although the circuit, as described, provides adequate current forcing, additional current forcing may be utilized to swing the output volt-ampere characteristic below selected steady state values in response to transients. This may be done by forcing current through windings 110 only during transients through a capacitor 118. The response time may be controlled by a variable impedance 120 which can be adjusted to change the time constant of its associated circuit.

Although the windings of the reactors 36 (Figure 1) and 104 (Figure 5) are shown as being mounted on one core, it is well known in the art that each main winding can be mounted on a separate core with separate associated control windings.

While the form of embodiment of the invention as herein disclosed constitutes a preferred form, it is to be understood that other forms might be adopted, all coming within the scope of the claims which follow.

What is claimed is as follows:

1. An alternating current energizable apparatus with a unidirectional output for operating a high current variable resistance load subject to sudden wide fluctuations, said apparatus comprising a saturable reactor, a rectifier adapted to receive energy through said reactor, a control winding on said reactor operable when energized to increase the impedance of said reactor, and current forcing means responsive to changes in load current for energizing said winding with sufficient force to overcome transient induced electromotive force in the winding, said current forcing means comprising reactive means including direct current winding means connectable to the load, and a pair of alternating current energizable windings oppositely related with respect to the direct current winding means.

2. An alternating current energizable apparatus for operating a high current variable resistance load subject to sudden wide fluctuations comprising circuit means including a half wave rectifier and a reactor with a main winding in series with the rectifier for supplying unidirectional current to a load, means including a control winding for the reactor for adjusting the impedance of the main winding, a second control winding on the reactor operable when energized to increase the impedance of the main winding, and a negative feedback current forcing circuit for energizing said second control winding, said forcing circuit being operable in response to load transients and including reactor means having direct current winding means and a pair of oppositely related alternating current winding means, and rectifier means connected between said alternating current winding means and the second control winding.

3. An apparatus for operating a high current variable resistance load such as an arc welder, said apparatus comprising a saturable reactor having a main winding and a control winding, a rectifier connected to receive energy through the main winding and deliver energy to the load, and a negative feedback circuit for supplying to the control winding a current proportional to the load current, said feedback circuit including a current forcing circuit for overcoming transient induced electromotive force in the control winding comprising saturable reactor means having direct current winding means and a pair of alternating current energizable windings oppositely related with respect to the direct current winding means, the direct current winding means being energizable from load current and the alternating current windings being coupled to furnish energy to said control winding.

4. An alternating current energizable apparatus with a unidirectional output for operating a variable resistance load, said apparatus comprising a saturable reactor, a rectifier adapted to receive energy through said reactor, a control winding on said reactor for controlling the impedance of said reactor, and a negative feedback circuit responsive to changes in load current for energizing said winding, said feedback circuit comprising saturable reactor means including direct current winding means connectable to the load and a pair of alternating current energizable windings oppositely related with respect to the direct current winding means, and circuit means connecting the alternating current windings and the control winding for energizing the control winding with current derived through the alternating current windings.

5. An alternating current energizable apparatus for operating a variable resistance load comprising circuit means including a half-wave rectifier and a reactor with a main winding in series with the rectifier for supplying unidirectional current to a load, a control winding on the reactor for controlling the impedance of the main winding, and a negative feedback circuit responsive to the load for energizing said control winding, said feedback circuit comprising saturable reactor means having direct current winding means and a pair of oppositely related alternating current windings, means for supplying the direct current winding means with unidirectional current responsive to the load current, and a circuit including rectifier means connecting said alternating current winding means and said control winding.

6. An apparatus for operating a variable resistance load comprising a saturable reactor having a main winding and a control winding, a rectifier connected to receive energy through the main winding and deliver energy to the load, a negative feedback circuit for supplying to the control winding a current proportional to the load current, said feedback circuit comprising saturable reactor means having direct current winding means and a pair of alternating current energizable windings oppositely related with respect to the direct current winding means, the direct current winding means being energizable from load current, and a circuit coupling the alternating current windings with said control winding to furnish energy to said control winding.

7. In an apparatus for supplying current to a load from an alternating current source, a saturable reactor for controlling the current supplied to the load, and a negative feedback circuit responsive to changes in load current for increasing the impedance of said reactor in response to load current increases, said feedback circuit comprising a control winding on said saturable reactor, saturable reactor means including two flux paths and alternating current winding means and direct current winding means, both winding means inductively linking both flux paths, means for supplying alternating current to said alternating current winding means, means for supplying the direct current winding means with direct current responsive to said load current, and means for energizing said control winding in response to the current in the alternating current winding means, the inductive relation between the respective winding means in one flux path being the reverse of the inductive relation between the respective winding means in the other flux path.

8. In an apparatus for supplying current to a load from an alternating current source, a saturable reactor for contolling the current supplied to the load, and a negative feedback circuit responsive to changes in load current for increasing the impedance of said reactor in response to load current increases, said feedback circuit comprising a control winding on said saturable reactor, saturable reactor means including two flux paths and alternating current winding means and direct current winding means, both winding means inductively linking both flux paths, means for supplying alternating current to said alternating current winding means, means for supplying the direct current winding means with direct current responsive to said load current, and a circuit including said control winding, said alternating current winding means and a rectifier for energizing said control winding with unidirectional current in response to the current in the alternating current winding means, the inductive relation between the respective winding means in one flux path being the reverse of the inductive relation between the respective winding means in the other flux path.

9. In an apparatus for supplying current to a load through a rectifier from an alternating current source, a saturable reactor in the supply circuit of the rectifier for controlling the current supplied to the load, and a negative feedback circuit responsive to changes in load current for increasing the impedance of said reactor in response to load current increases, said feedback circuit comprising a control winding on said saturable reactor, saturable reactor means including two flux paths and alternating current winding means and direct current winding means, both winding means inductively linking both flux paths, means for supplying alternating current to said alternating current winding means, means for supplying the direct current winding means with direct current responsive to said load current, and means for energizing said control winding in response to the current in the alternating current winding means, the inductive relation between the respective winding means in one flux path being the reverse of the inductive relation between the respective winding means in the other flux path.

10. In an apparatus for supplying current to a load through a rectifier from an alternating current source, a saturable reactor in the supply circuit of the rectifier for controlling the current supplied to the load, and a negative feedback circuit responsive to changes in load current for increasing the impedance of said reactor in response to load current increases, said feedback circuit comprising a control winding on said saturable reactor, saturable reactor means including two flux paths and alternating current winding means and direct current winding means, both winding means inductively linking both flux paths, means for supplying alternating current to said alternating current winding means, means for supplying the direct current winding means with direct current responsive to said load current, and a circuit including said control winding, said alternating current winding means and a rectifier for energizing said control winding with unidirectional current in response to the current in the alternating current winding means, the inductive relation between the respective winding means in one flux path being the reverse of the inductive relation between the respective winding means in the other flux path.

11. In an apparatus for supplying current to a load from an alternating current source, a saturable reactor for controlling the current supplied to the load, and a negative feedback circuit responsive to changes in load current for increasing the impedance of said reactor in response to load current increases, said feedback circuit comprising a control winding on said saturable reactor, saturable reactor means including two flux paths, alternating current winding means and direct current winding means, both winding means inductively linking both flux paths, means for supplying alternating current to said alternating current winding means, means for supplying the direct current winding means with current responsive to said load current, means for energizing said control winding in response to the current in the alternating current winding means, and time constant control means including a condenser in series with the control winding and a resistor in parallel with the control winding, the inductive relation between the respective winding means in one flux path being the reverse of the inductive relation between the respective winding means in the other flux path.

12. An apparatus for operating a variable resistance load comprising a saturable reactor having a main winding and a control winding, a rectifier connected to receive energy through the main winding and deliver energy to the load, a negative feedback circuit for supplying to the control winding a current proportional to the load current, said feedback circuit comprising saturable reactor means having direct current winding means and a pair of series-connected alternating current energizable windings oppositely related with respect to the direct current winding means, the direct current winding means being energizable from load current, and a circuit coupling the alternating current windings with said control winding to furnish energy to said control winding.

13. In an apparatus for supplying current to a load from an alternating current source, a saturable reactor for controlling the current supplied to the load, and a negative feedback circuit responsive to changes in load current for increasing the impedance of said reactor in response to load current increases, said feedback circuit comprising a control winding on said saturable reactor, saturable reactor means including two flux paths and direct current winding means and a pair of series-connected alternating current windings, each alternating current winding inductively linking a different one of said flux paths, the direct current winding means inductively linking both flux paths, means for supplying alternating current to said alternating current windings, means for supplying the direct current winding means with direct current responsive to said load current, and means for energizing said control winding in response to the current in the alternating current windings, the inductive relation between one alternating current winding and the direct current winding means in one flux path being the reverse of the inductive relation between the other alternating current winding and the direct current winding means in the other flux path.

References Cited in the file of this patent
UNITED STATES PATENTS

| | | |
|---|---|---|
| 1,650,072 | Jonas et al. | Nov. 22, 1927 |
| 1,963,093 | Logan | June 19, 1934 |
| 2,012,588 | Logan | Aug. 27, 1935 |
| 2,068,188 | Logan | Jan. 19, 1937 |
| 2,114,827 | Aggers | Apr. 19, 1938 |
| 2,179,299 | Murcek | Nov. 7, 1939 |